(12) United States Patent
Lavergne et al.

(10) Patent No.: US 9,593,465 B2
(45) Date of Patent: Mar. 14, 2017

(54) HEAT EXCHANGER FOR ENERGY RECOVERY CYLINDER

(75) Inventors: Hans-Peter Lavergne, Trunkelsburg (DE); Philipp Egenrieder, Ulm (DE); Dirk Asam, Ulm (DE)

(73) Assignee: LIEBHERR-HYDRAULIKBAGGER GMBH, Kirchdorf/Iller (DE)

( * ) Notice: Subject to any disclaimer, the term of this patent is extended or adjusted under 35 U.S.C. 154(b) by 26 days.

(21) Appl. No.: 13/297,738

(22) Filed: Nov. 16, 2011

(65) Prior Publication Data
US 2012/0291429 A1    Nov. 22, 2012

(30) Foreign Application Priority Data
Nov. 17, 2010   (DE) ........................ 10 2010 051 664

(51) Int. Cl.
| | | |
|---|---|---|
| F01B 29/08 | (2006.01) | |
| E02F 9/22 | (2006.01) | |
| F16F 9/02 | (2006.01) | |
| F16F 9/42 | (2006.01) | |

(52) U.S. Cl.
CPC .......... *E02F 9/2217* (2013.01); *F16F 9/0209* (2013.01); *F16F 9/42* (2013.01)

(58) Field of Classification Search
CPC ......... E02F 9/22; E02F 9/2217; F16F 9/0209; F16F 9/42
USPC ............ 60/372, 415, 508; 91/4 R, 4 A, 169; 92/51, 52; 165/177, 184; 123/41.67, 123/41.68, 41.8
See application file for complete search history.

(56) References Cited

U.S. PATENT DOCUMENTS

| | | | | |
|---|---|---|---|---|
| 2,525,092 A | * | 10/1950 | Bruegger | ................ B21C 37/26 165/184 |
| 3,834,448 A | * | 9/1974 | Cooksley | ........................ 165/154 |
| 3,921,404 A | * | 11/1975 | Mason | .................. F01K 23/065 60/618 |
| 4,657,074 A | * | 4/1987 | Tomita | .................... F24H 3/065 165/179 |
| 5,195,261 A | | 3/1993 | Vachon | |
| 5,246,247 A | | 9/1993 | Runkel | |
| 5,331,884 A | | 7/1994 | Ando | |
| 5,379,832 A | | 1/1995 | Dempsey | |
| 5,881,801 A | * | 3/1999 | Hayakawa | ................ F02G 1/00 165/104.24 |

(Continued)

FOREIGN PATENT DOCUMENTS

| | | |
|---|---|---|
| DE | 2060091 | 6/1972 |
| DE | 9204861 U1 | 7/1992 |

(Continued)

OTHER PUBLICATIONS

Co-pending U.S. Appl. No. 13/298,398, filed Nov. 17, 2011.

(Continued)

*Primary Examiner* — Thomas Denion
*Assistant Examiner* — Mickey France
(74) *Attorney, Agent, or Firm* — Dilworth & Barrese, LLP.

(57) ABSTRACT

The present invention relates to an implement, in particular an excavator or a machine for material handling, with an element movable via at least one working drive, wherein at least one energy recovery cylinder is provided for energy recovery from the movement of the movable element, which includes a chamber filled with gas. The energy recovery cylinder is equipped with a heat exchanger.

16 Claims, 8 Drawing Sheets

(56) References Cited

U.S. PATENT DOCUMENTS

| | | | |
|---|---|---|---|
| 6,092,590 A * | 7/2000 | Suttrop | B64G 1/50 165/154 |
| 6,223,702 B1 * | 5/2001 | Achenbach | F02F 1/10 123/41.71 |
| 7,220,365 B2 * | 5/2007 | Qu | C09K 5/14 165/104.15 |
| 7,802,426 B2 | 9/2010 | Bollinger | |
| 8,364,354 B2 | 1/2013 | Pline | |
| 2004/0020204 A1 * | 2/2004 | Callas | F02B 29/0412 60/612 |
| 2005/0284618 A1 * | 12/2005 | McGrevy | 165/156 |
| 2007/0068754 A1 | 3/2007 | Furgala | |
| 2007/0278030 A1 | 12/2007 | Knapp | |
| 2007/0289327 A1 | 12/2007 | Lessing | |
| 2008/0017361 A1 * | 1/2008 | Van Decker et al. | 165/156 |
| 2008/0098908 A1 * | 5/2008 | Song et al. | 100/218 |
| 2008/0282734 A1 * | 11/2008 | Kolberg et al. | 65/32.2 |
| 2009/0107784 A1 * | 4/2009 | Gabriel | B60G 17/002 188/313 |
| 2010/0018195 A1 * | 1/2010 | Stanger et al. | 60/414 |
| 2010/0044011 A1 * | 2/2010 | Schleiter | 165/104.19 |
| 2011/0030364 A1 | 2/2011 | Persson et al. | |
| 2012/0297762 A1 | 11/2012 | Lavergne et al. | |

FOREIGN PATENT DOCUMENTS

| | | | |
|---|---|---|---|
| DE | 10 2004034706 B3 | 2/2006 | |
| DE | 202006009223 | 10/2007 | |
| DE | 102007011100 A1 | 9/2008 | |
| DE | 102008034582 | 1/2010 | |
| DE | 102010032415 A1 | 2/2012 | |
| EP | 2052889 A1 | 4/2009 | |
| JP | S46-003769 | 11/1971 | |
| JP | S54-144815 | 11/1979 | |
| JP | S56-062450 | 5/1981 | |
| JP | 2543029 | 4/1987 | |
| JP | S62155310 | 7/1987 | |
| JP | H64-053467 | 3/1989 | |
| JP | H01-146014 | 6/1989 | |
| JP | H02-143537 | 6/1990 | |
| JP | H03-084383 | 9/1991 | |
| JP | H10-227324 | 8/1998 | |
| JP | 3664457 B2 * | 6/2005 | F28D 7/024 |
| JP | 2010032046 | 2/2010 | |
| JP | H2010-032046 | 2/2010 | |
| JP | 2010216557 | 9/2010 | |
| RU | 2402697 C1 | 10/2010 | |
| WO | 97/16371 A1 | 5/1997 | |
| WO | 97/17546 | 5/1997 | |
| WO | 00/37800 | 6/2000 | |
| WO | 02/095243 | 11/2002 | |
| WO | 2004/113622 A1 | 12/2004 | |
| WO | 2010/134840 A1 | 11/2010 | |

OTHER PUBLICATIONS

Office Action dated Mar. 13, 2015 in related Russian Application No. 2011146583/03(069753).
Japanese Office Action, Feb. 17, 2015.
Notice of Reasons for Rejection dated Jan. 26, 2016 in counterpart Japanese Patent Application No. 2011-248702.

* cited by examiner

HEAT EXCHANGER FOR ENERGY RECOVERY CYLINDER

BACKGROUND OF THE INVENTION

The present invention relates to an implement with an element movable via at least one working drive, wherein at least one energy recovery cylinder is provided for energy recovery from the movement of the movable element, which includes a chamber filled with gas. In particular, the present invention relates to a traveling implement, in particular an excavator or a machine for material handling. In particular, the working drive comprises a working hydraulic cylinder.

In such implements, the gas-filled chamber of the energy recovery cylinder is compressed when lowering the movable element and thus stores the potential energy, in order to release the same again during an upward movement of the movable element for supporting the working drive.

From DE 10 2008 034 582 A1 an implement is known, in which the gas-filled chamber of the energy recovery cylinder is formed by the gas-filled bottom side of the energy recovery cylinder and the hollow piston rod of the energy recovery cylinder.

SUMMARY OF THE INVENTION

It is the object of the present invention to further improve the function of an implement with an energy recovery cylinder with a chamber filled with gas.

In accordance with the invention, this object is solved by an implement according to the description herein. The present invention discloses an implement, in particular a traveling implement, in particular an excavator or a machine for material handling, with an element movable via at least one working drive, wherein at least one energy recovery cylinder is provided for energy recovery from the movement of the movable element, which includes a chamber filled with gas. In accordance with the invention it now is provided that the energy recovery cylinder includes a heat exchanger.

The inventors of the present invention now have found that the temperature of the gas in the gas-filled chamber of the energy recovery cylinder has a great influence on the function of the energy recovery cylinder and hence of the implement. In particular, the force-path characteristic curve of the energy recovery cylinder changes with the temperature of the gas. By means of the heat exchanger, temperature fluctuations of the gas and/or too high and/or too low temperatures of the gas in the energy recovery, cylinder can be reduced or prevented.

In particular, it was found that the gas in the gas-filled chamber can heat up due to the operation. As a result, undesirably high temperatures can be obtained. In a preferred embodiment of the present invention, the energy recovery cylinder according to the invention therefore is equipped with a heat exchanger by which the energy recovery cylinder and/or the gas in the gas-filled chamber can be cooled or is cooled.

Furthermore, also at too low temperatures of the gas (e.g. at low outside temperatures) an unfavorable characteristic curve or a too low cylinder force of the energy recovery cylinder can be obtained. In a further embodiment of the present invention, the energy recovery cylinder according to the invention therefore is equipped with a heat exchanger by which the energy recovery cylinder and/or the gas in the chamber filled with gas can be heated.

In this way, temperature situations unfavorable for the operation of the implement can be eliminated or at least be improved.

Advantageously, it is provided that the heat exchanger surrounds the cylinder jacket of the energy recovery cylinder. This provides a large surface for heat exchange. In addition, the internal structure of the energy recovery cylinder need not be interfered with.

Advantageously, the present invention is used in an energy recovery cylinder which on its bottom side is filled with gas. The gas in the gas-filled chamber hence is in direct contact with the cylinder jacket, so that the arrangement of the heat exchanger at the cylinder jacket is particularly advantageous.

Advantageously, the heat exchanger surrounds more than 50% of the outer surface of the cylinder jacket. In a furthermore advantageous way, the heat exchanger surrounds more than 70%, and furthermore advantageously more than 90% of the outer surface of the cylinder jacket. This ensures a particularly good heat transfer.

Heat exchange elements of the heat exchanger can be arranged directly on the cylinder jacket of the heat exchanger. In an alternative embodiment, however, the heat exchanger comprises a cylinder tube which is arranged on the outer surface of the cylinder jacket of the energy recovery cylinder in a heat-conducting manner. This simplifies the manufacture of the heat exchanger which can be pushed onto the energy recovery cylinder as an autarkical unit.

Depending on its design, the heat exchanger according to the invention can be used for an active or also only for a passive cooling or heating of the energy recovery cylinder.

In a first embodiment of the implement according to the invention, the heat exchanger includes cooling ribs which can be swept by the outside air. This ensures an efficient cooling of the energy recovery cylinder by the outside air. In particular, the cooling ribs increase the surface of the energy recovery cylinder.

Advantageously, the cooling ribs extend from the cylinder jacket of the energy recovery cylinder or a cylinder tube of the heat exchanger to the outside. The cooling ribs can extend for example in radial direction, in longitudinal direction or spirally.

In a further embodiment of the present invention, however, the heat exchanger can include a flow space which is traversed by a cooling fluid. In particular, the flow space includes an inlet and an outlet, with which the heat exchanger can be connected to a cooling circuit and to a heat circuit, respectively. For this purpose, the flow space in particular includes connecting elements, via which hoses for conducting the cooling fluid can be connected.

It can be provided that the heat exchanger includes an outer tube which forms an outer wall of the flow space. In particular, the flow space can be arranged between the outer surface of the cylinder jacket of the energy recovery cylinder and the outer tube. In an alternative embodiment, in which the heat exchanger comprises a cylinder tube which is arranged on the outer surface of the cylinder jacket in a heat-conducting manner, the flow space can also be arranged between this cylinder tube and the outer tube.

Furthermore, it can be provided in accordance with the invention that the flow space spirally surrounds the cylinder jacket. In this way, a particularly uniform flow of the cooling fluid through the flow space can be ensured. The spiral flow space can be provided by a tube conduit which is guided spirally around the cylinder jacket and the cylinder tube, respectively. Alternatively, a helical connecting arrangement can also be provided between the outer tube and the cylinder jacket or the cylinder tube, by which the flow space is spirally divided. The helical connecting arrangement can be arranged on the cylinder jacket or on the cylinder tube. In particular, the connecting arrangement can be incorporated in the material of the cylinder jacket or cylinder tube. Alternatively or in addition, the helical connecting arrangement can also be arranged on the outer tube, in particular be incorporated in the material of the outer tube.

The heat exchanger according to the invention can serve for cooling the energy recovery cylinder or the gas present in the same. Advantageously, the heat exchanger therefore is connected to a cooling circuit of the implement.

Furthermore, the heat exchanger can serve for heating the energy recovery cylinder. Advantageously, the heat exchanger therefore is connected to a heating circuit of the implement.

In particular, the heat exchanger can be connected to a combined cooling and heating circuit of the implement.

Beside the implement, the present invention furthermore comprises an energy recovery cylinder for an implement as it has been described above. The energy recovery cylinder according to the invention in particular comprises a heat exchanger. Advantageously, the energy recovery cylinder is constructed as it has been described above.

Independent of the above-described implement or energy recovery cylinder with a heat exchanger, the present invention furthermore comprises an implement, in particular a traveling implement, in particular an excavator or a machine for material handling, with an element movable via at least one working drive, wherein at least one energy recovery cylinder is provided for energy recovery from the movement of the movable element, which includes a chamber filled with gas, wherein according to the invention a device for adjusting the temperature of the energy recovery cylinder is provided. This aspect of the present invention also takes account of the finding that the temperature of the energy recovery cylinder or the gas present therein is decisive for the operation of the implement. In accordance with the invention, the temperature of the energy recovery cylinder can now be adjusted. In this way, unfavorable temperature situations can be avoided or improved.

It can be provided that the device for adjusting the temperature of the energy recovery cylinder provides for a heating of the energy recovery cylinder. In particular, for example at cold ambient temperatures, the energy recovery cylinder thus can be brought to a certain operating temperature. Heating the energy recovery cylinder can be effected in different ways.

In particular, a heating element can be provided, by which the energy recovery cylinder is heated. The heating element can be arranged at the energy recovery cylinder, in particular at the cylinder jacket. Advantageously, the heating element is an electrically operated heating element.

Furthermore, heating can be effected via a heat exchanger. In particular, this advantageously is a heat exchanger as it has been described above. Advantageously, the heat exchanger is connected to a heat circuit. In particular, a heating element for heating the fluid in the heat circuit is provided in the heat circuit, in particular an electric heating element.

Heating can also be effected via a friction element. In particular, the friction element according to the invention increases the friction during a movement of the energy recovery cylinder. In particular, the friction element generates friction heat between the friction element and the cylinder rod of the energy recovery cylinder, when the cylinder rod is moved with respect to the cylinder jacket. Advantageously, the friction element is provided with an actuator and thus can be actuated. In particular, the contact pressure of the friction element advantageously can be controlled via the actuator.

Furthermore, it can be provided that the device for adjusting the temperature of the energy recovery cylinder provides for cooling the energy recovery cylinder. In particular, an uncontrolled heating of the energy recovery cylinder during operation can be counteracted thereby.

Advantageously, cooling is effected via a heat exchanger. Advantageously, this heat exchanger is configured such as it has been described above.

Advantageously, the adjustment of the temperature of the energy recovery cylinder in the present invention is effected by a selective actuation of the device for adjusting the temperature by a controller. Particularly preferably, the device for adjusting the temperature of the energy recovery cylinder is actuated on the basis of at least one operating parameter of the implement.

Furthermore advantageously, a temperature sensor is provided in accordance with the invention, wherein the actuation of the device for adjusting the temperature of the energy recovery cylinder is effected on the basis of a signal of the temperature sensor. In particular, such temperature sensor advantageously provides for controlling the temperature of the energy recovery cylinder.

In an advantageous aspect of the present invention, the temperature sensor measures the temperature of the energy recovery cylinder and/or the temperature of the gas in the chamber filled with gas and/or the temperature of a cooling fluid. This provides for a control or regulation of the temperature of the energy recovery cylinder or the temperature of the gas in the gas-filled chamber of the energy recovery cylinder. Alternatively or in addition, the temperature sensor can also measure the outside temperature. This also provides for an effective actuation of the device for adjusting the temperature of the energy recovery cylinder.

The implement can include a controller by which the device for adjusting the temperature of the energy recovery cylinder is actuated such that the energy recovery cylinder is heated below a first threshold temperature. Alternatively or in addition, it can be provided that the device for adjusting the temperature of the energy recovery cylinder is actuated by the controller such that the energy recovery cylinder is cooled above a second threshold temperature.

Furthermore, it can be provided alternatively or in addition that the energy recovery cylinder undergoes no cooling and/or heating within a temperature window. By switching off the device for adjusting the temperature within a certain temperature window, the energy consumption for adjusting the temperature can be kept as low as possible.

In accordance with the invention, the energy recovery cylinder can comprise a heat exchanger which is connected to a cooling circuit through which a cooling fluid flows. Depending on its configuration, the cooling circuit can be used for cooling and/or for heating the energy recovery cylinder.

Advantageously, the cooling circuit includes a cooling unit for cooling the cooling fluid. Alternatively or in addition, it can be provided that the cooling circuit includes a heating unit for heating the cooling fluid. Furthermore, it can be provided that the cooling circuit includes a pump for circulating the cooling fluid. By actuating the pump, the cooling unit and/or the heating unit, the cooling and/or heating of the energy recovery cylinder thus can be actuated in accordance with the invention.

The actuation of the device for adjusting the temperature of the energy recovery cylinder need not necessarily only serve for adjusting the temperature of the energy recovery cylinder, but can also serve for adjusting the temperature of further components of the implement.

Advantageously, the cooling circuit of the energy recovery cylinder is connected to the cooling circuit of a further component of the implement. In particular, the cooling circuit is the cooling circuit of an internal combustion engine and/or of a hydraulic system of the implement. Internal combustion engines and/or hydraulic systems usually already include a cooling circuit. The same usually operates on the basis of a cooling liquid.

By connecting the energy recovery cylinder to the cooling circuit of a further component of the implement, two problems can be solved already in an extremely inexpensive and simple way. The cooling circuit of the component usually always has a constant temperature. As a result, the energy recovery cylinder can be heated to a certain operating temperature at the beginning of the operation.

The second point is the cooling of the energy recovery cylinder by the cooling circuit. It can thereby be prevented that the temperature can rise excessively and thus the existing pressure relief valves, which are designed as burst fuses, are activated. Alternatively, however, a separate cooling arrangement can also be chosen for cooling the energy recovery cylinder, and the cooling circuit of the further element of the implement can only be used for heating.

In particular, it is ensured that in the cylinder always the same operating pressure exists and that the operating pressure in the cylinder only fluctuates within a specified window. As a result, always a constant or similar force/stroke curve is ensured in the energy recovery cylinder, independent of the outside temperature or the mode of operation.

Both problems can of course be solved not only by connecting a heat exchanger of the energy recovery cylinder to the cooling circuit of an already existing component of an implement, but also by an independent actuation of the temperature of the energy recovery cylinder and/or an only temporary connection with such cooling circuit.

In particular, a circuit arrangement can be provided, by which the heat exchanger of the energy recovery cylinder is connected with and separated from the cooling circuit of the already existing component of the implement on the basis of an operating parameter, in particular on the basis of a temperature signal. In particular, the circuit arrangement can employ threshold temperatures, as has been set forth above.

Beside the implement according to the invention, the present invention furthermore comprises a method for operating such implement. In particular, the temperature of the energy recovery cylinder is increased and/or reduced thereby. Depending on the embodiment of the method according to the invention, there can also be effected only an increase or only a reduction of the temperature of the energy recovery cylinder. Advantageously, the increase and/or reduction of the temperature of the energy recovery cylinder is effected in dependence on at least one operating parameter.

Advantageously, the method is effected such as has already been described above with regard to the implement.

Beside the implement and the method, the present invention furthermore comprises a corresponding energy recovery cylinder. Advantageously, this energy recovery cylinder includes a device for adjusting the temperature or is connectable to such device.

Furthermore, the present invention comprises a corresponding device for adjusting the temperature of an energy recovery cylinder.

Furthermore, the present invention comprises a set of an energy recovery cylinder and a device for adjusting the temperature of the energy recovery cylinder.

Particularly preferred uses of the present invention will now briefly be described once more:

The implement according to the invention in particular is a traveling implement, in particular an excavator or a machine for material handling.

The same includes an element movable via at least one working drive, wherein at least one energy recovery cylinder is provided for energy recovery from the movement of the movable element. As working drive, in particular a working hydraulic cylinder can be used.

The energy recovery cylinder with the gas-filled chamber itself serves as energy accumulator for energy recovery from the movement of the movable element. The space formed by the bottom side of the energy recovery cylinder advantageously is filled with pressurized gas which is compressed during a movement of the piston rod against the bottom. The energy stored then is available again during an upward movement of the piston rod for supporting the working drive, in particular the working hydraulic cylinder. In a furthermore advantageous way, the piston rod of the energy recovery cylinder is hollow and open towards the bottom side, so that the interior of the piston rod forms a part of the chamber filled with gas.

The movable element of the implement according to the invention advantageously is pivotally attached to the implement about a vertical axis of rotation and pivotable in a vertical swivel plane via the one or more working drives. In particular, the movable element is the arm of an excavator or the boom of a machine for material handling. Furthermore advantageously, the traveling implement includes an undercarriage with traveling gear and an uppercarriage rotatably arranged thereon about a vertical axis of rotation, to which the movable element is articulated.

On the movable element a working tool, for example a shovel or a grab, can be arranged. When lowering the movable element, the potential energy of the movable element and of the working tool is stored via the energy recovery cylinder, in order to at least partly compensate the equipment weight again during the upward movement of the movable element. As a result, less energy must be spent via the working drive, in order to move the movable element upwards. As a result, the energy balance of the implement is improved, since less installed engine power is required and the fuel consumption is lowered.

Like the one or more working hydraulic cylinders, the energy recovery cylinder according to the invention advantageously is arranged between an uppercarriage of the implement and the movable element. During a movement of the movable element, the energy recovery cylinder thus moves simultaneously with the working hydraulic cylinder.

BRIEF DESCRIPTION OF THE DRAWINGS

The present invention will now be explained in detail with reference to exemplary embodiments and drawings.

In the drawings.

DESCRIPTION OF THE PREFERRED EMBODIMENTS

Figure 1:
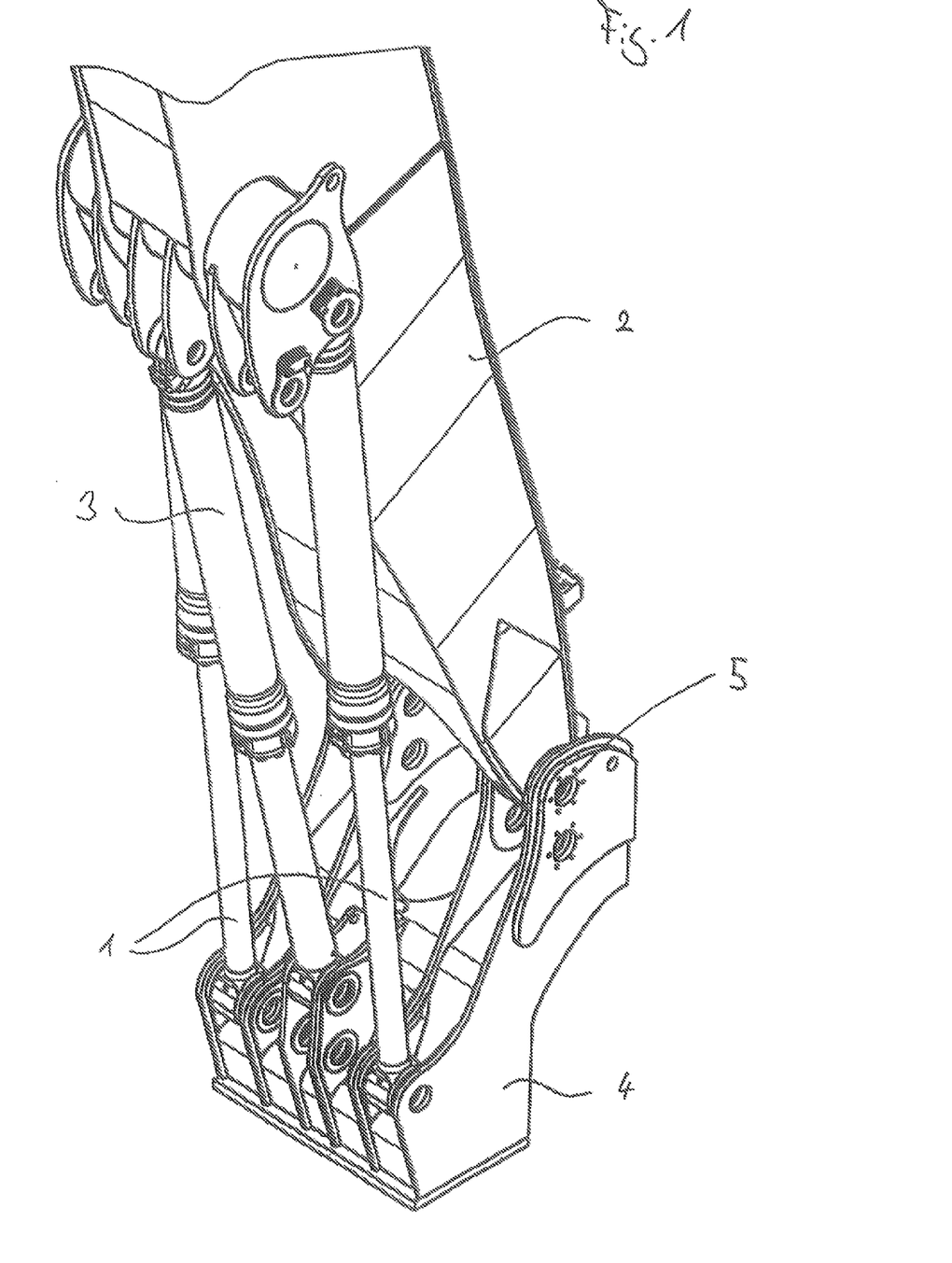
FIG. 1 shows an exemplary embodiment of an implement according to the invention with two working hydraulic cylinders and one energy recovery cylinder.
Figure 2A:
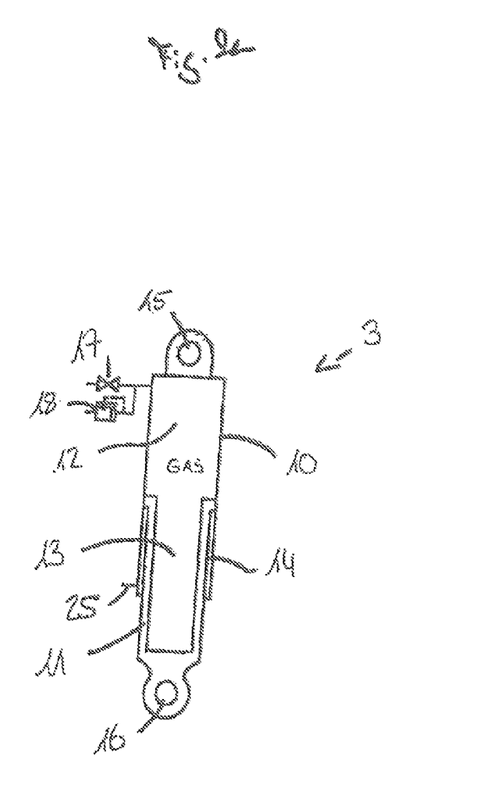
FIG. 2a shows a schematic diagram of a first variant of the energy recovery cylinder according to the invention.
Figure 2B:
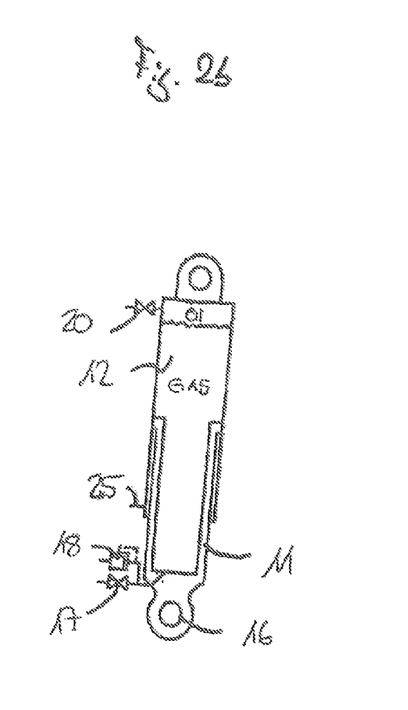
FIG. 2b shows a schematic diagram of a second variant of the energy recovery cylinder according to the invention.

With reference to FIGS. 1 and 2 an exemplary embodiment of an implement with an energy recovery cylinder will now first be shown in general, in which the present invention can be used.

The implement comprises a movable element 2 which is articulated to a welded construction 4 of the implement via a horizontally extending swivel axis 5. The implement is a hydraulic excavator in which the movable element 2 is mounted around the excavator arm, which is articulated to the uppercarriage of the excavator. The uppercarriage itself is pivotally attached to an undercarriage with chassis about a vertical axis of rotation.

For moving the movable element 2, two working hydraulic cylinders 1 are provided, which via corresponding articulation points are articulated to the movable element 2 and to the welded construction 4 of the uppercarriage. Furthermore, an exemplary embodiment of an energy recovery cylinder 3 according to the invention is provided, which like the working hydraulic cylinders 1 is arranged between the movable element 2 and the uppercarriage of the implement 4 and serves for energy recovery from the movement of the movable element. The energy recovery cylinder 3 is arranged between the two working hydraulic cylinders 1.

On the movable element 2, in this case the excavator boom, a work equipment, for example an excavator shovel, usually is arranged. When lowering the movable element 2, the potential energy of the movable element and of the work equipment should now be recovered and stored, in order to at least partly compensate the static forces, which otherwise would rest on the working hydraulic cylinders due to the weight of the movable element and the work equipment, during the upward movement of the movable element and to thus have to supply less energy by means of the working hydraulic cylinders 1. For this purpose, the hydraulic cylinder according to the invention advantageously includes a chamber filled with gas. On lowering the movable element, the gas in the gas-filled chamber of the energy recovery cylinder is compressed, whereas it expands on lifting the movable element and thereby supports the working hydraulic cylinders 1. For this purpose, the energy recovery cylinder according to the invention advantageously is filled with gas on its bottom side and furthermore advantageously includes a hollow piston rod open towards the bottom side.

FIGS. 2a and 2b now show schematic drawings of two variants of an energy recovery cylinder 3. Both exemplary embodiments include a cylinder 10 in which a piston rod 11 is axially movably mounted. The piston rod 11 has the shape of a hollow cylinder, so that in the interior of the piston rod 11 a cavity 13 is obtained, which is open towards the bottom side 12 of the cylinder. The bottom side 12 of the energy recovery cylinder 3 and the cavity 13 in the interior of the piston rod 11 form a coherent chamber which is filled with pressurized gas. During a movement of the piston rod 11 in the cylinder 10 the size of the bottom side 12 is varied, so that with fully retracted piston rod 11 the volume filled with gas substantially corresponds to the cavity 13 in the interior of the hollow piston rod, whereas with fully extended piston rod it corresponds to the volume of this cavity 13 plus the volume of the cylinder 10.

The energy recovery cylinder includes a bottom-side bearing point 15 and a piston-rodside bearing point 16, with which it is articulated to the implement and movable element. The energy recovery cylinder is articulated between movable element and implement such that the piston rod 11 is moved downwards against the bottom of the energy recovery cylinder by the weight of the movable element and the work equipment, so that the gas volume is compressed. Due to the design of the energy recovery cylinder according to the invention with a hollow piston rod 11, sufficient gas volume also is present with retracted cylinder, in order to provide for a flat increase in pressure when lowering the work equipment. On the other hand, during an upward movement of the movable element, part of the weight rests on the gas volume in the energy recovery cylinder, so that the working hydraulic cylinders no longer must apply the complete static load.

The energy recovery cylinder includes a filling valve 17 for filling the chamber with gas and a pressure limiting valve 18 for limiting the gas pressure. In the first exemplary embodiment in FIG. 2a, the filling valve 17 and the pressure limiting valve 18 are arranged on the bottom side. In the second exemplary embodiment shown in FIG. 2b, however, the filling valve 17 and the pressure limiting valve 18 are arranged on the side of the piston rod.

The energy recovery cylinders shown in FIGS. 2a and 2b are two-sided hydraulic cylinders, so that an annular space 14 is provided, which is connectable to a hydraulic system of the implement via a port 25. The bottom side also can include a port via which it is connectable to a hydraulic system of the implement.

As shown in FIG. 2b, the gas volume in the energy recovery cylinder can be varied by supplying or discharging oil to or from the energy recovery cylinder. In the second exemplary embodiment in FIG. 2b, a port 20 for supplying oil therefore is provided, by which the bottom space of the energy recovery cylinder is connectable to a hydraulic system of the implement.

The inventors of the present invention have found that in operation of an energy recovery cylinder heat is generated by the compression of the gas, due to which the energy recovery cylinder can heat up in an uncontrolled way. In addition, the characteristic curve of the energy recovery cylinder is changed in dependence on the temperature of the gas in the chamber filled with gas.

In a first aspect, the present invention therefore provides an energy recovery cylinder with a heat exchanger. Advantageously, the same at least provides for cooling the energy recovery cylinder. Cooling can be effected in an active or passive way. Alternatively or in addition, the heat exchanger can, however, also serve for heating the energy recovery cylinder.

Figures 3, 4A:
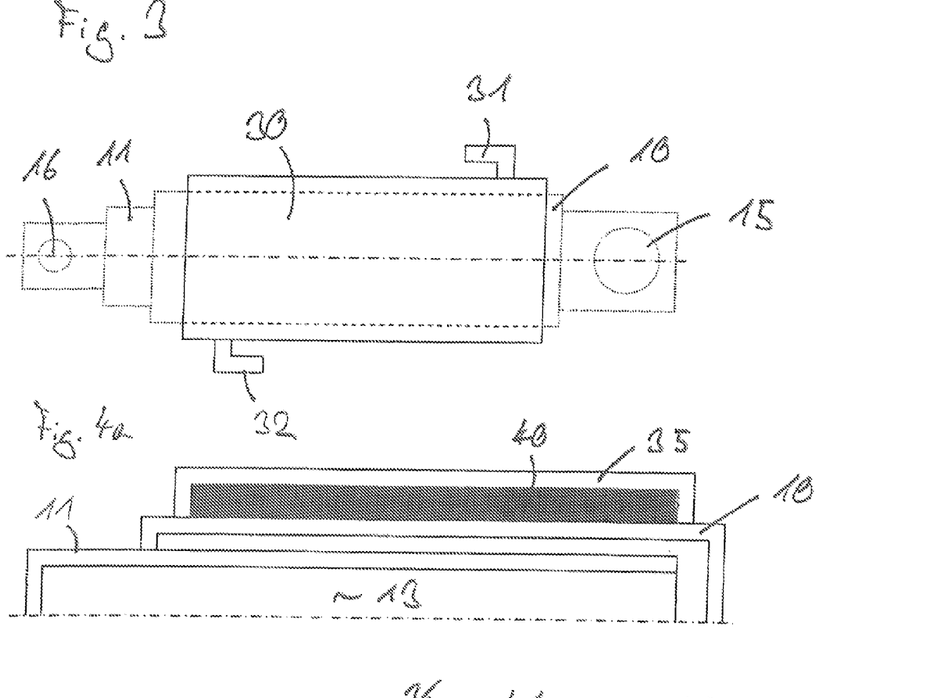
FIG. 3 shows an exemplary embodiment of an energy recovery cylinder according to the invention with a heat exchanger which includes a flow space through which a cooling fluid can flow.
FIGS. 4a to 4d show four variants of a heat exchanger, as it is shown in FIG. 3, in sectional views, wherein the heat exchanger is arranged directly on the cylinder jacket of the energy recovery cylinder.

A first exemplary embodiment of such energy recovery cylinder is shown in FIG. 3. The energy recovery cylinder includes a heat exchanger 30 with a flow space which is connectable to a cooling circuit and through which a cooling fluid can flow. For this purpose, the heat exchanger 30 includes ports 31 and 32, via which it is connectable to the cooling circuit, in particular via hose lines.

The heat exchanger 30 is arranged on the cylinder jacket 10 of the energy recovery cylinder and in the exemplary embodiment substantially extends along the entire length of the cylinder jacket, in order to thus provide for a heat transfer as good as possible between the gas in the interior of the energy recovery cylinder and the cooling fluid.

Figure 4B:
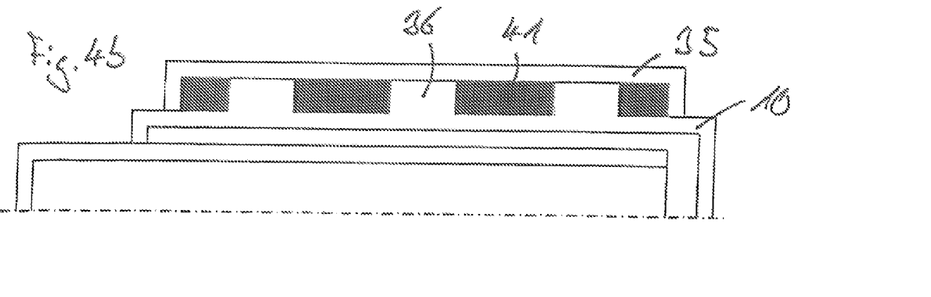
Figure 4C:
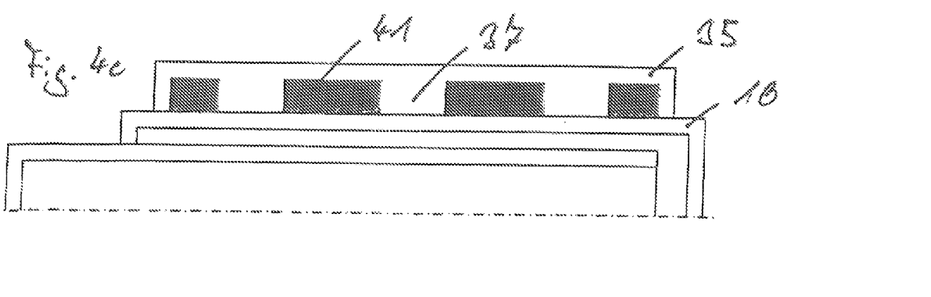

FIGS. 4a to 4d now show four variants of such a heat exchanger, wherein the heat exchanger is arranged directly on the cylinder jacket 10. In FIGS. 4a to 4c, the cylinder jacket 10 of the energy recovery cylinder forms a boundary wall of the flow space of the heat exchanger. There is provided an outer tube 35 which is pushed over the cylinder jacket 10 and forms an outer wall of the flow space of the energy recovery cylinder.

In the exemplary embodiment shown in FIG. 4a, a simple cylindrical sleeve 35 is provided as outer tube, which is arranged directly on the cylinder jacket 10, so that the flow space forms a hollow cylindrical space between the cylinder jacket 10 and the outer tube 35.

In the exemplary embodiments shown in FIGS. 4b and 4c, the flow space 41 on the other hand extends spirally around the energy recovery cylinder. In this way, a more uniform distribution of heat in the flow space is achieved. For this purpose, a spiral helix can be provided in the flow space, which divides the same into a spiral extension.

In FIG. 4b, the spiral flow space 41 is generated in that the cylinder jacket 10 includes a spiral helix 36 which generates the spiral flow space 41. In the exemplary embodiment shown in FIG. 4c, this is realized on the outer tube 35 which includes the spiral helix 37.

The flow space 41 hence is provided by the spiral helix or the corresponding spiral recesses in the cylinder jacket 10 or in the outer tube 35, which are arranged between the helices 36 and 37, respectively. These recesses can be incorporated in the material of the cylinder jacket 10 and of the outer tube 35, respectively. Alternatively, a spiral helix might also be arranged as separate element between cylinder jacket 10 and outer tube 35.

Figure 4D:
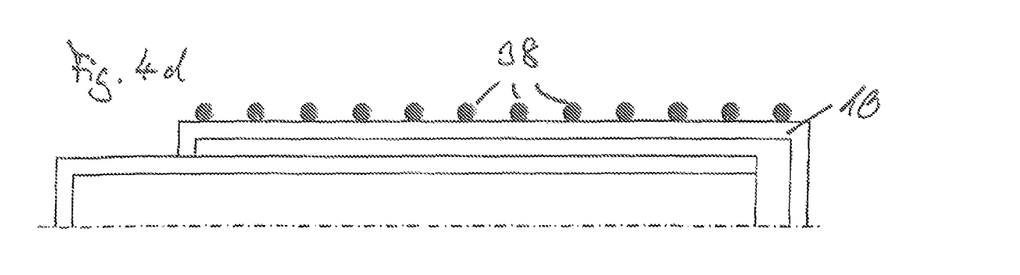
Figure 5A:
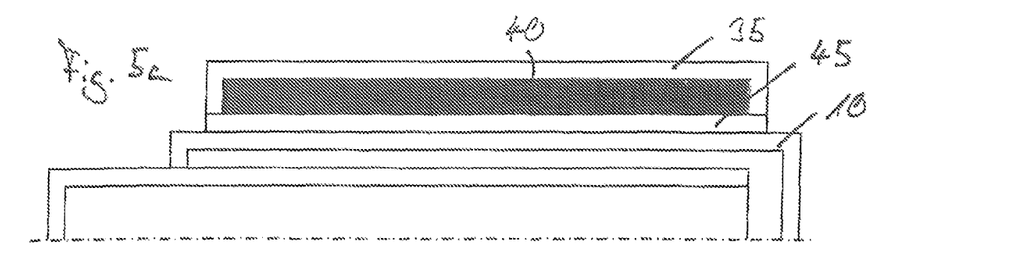
FIGS. 5a to 5d show four variants of an energy recovery cylinder with a heat exchanger, as it is shown in FIG. 3, in a sectional view, wherein the heat exchanger comprises a cylinder tube arranged on the cylinder jacket of the energy recovery cylinder.
Figure 5B:
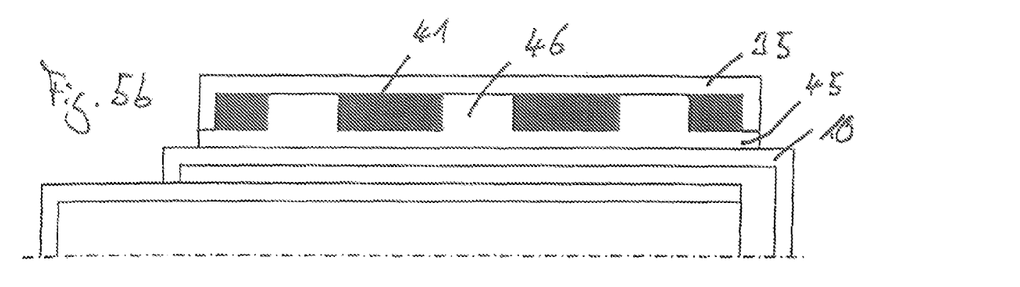
Figure 5C:
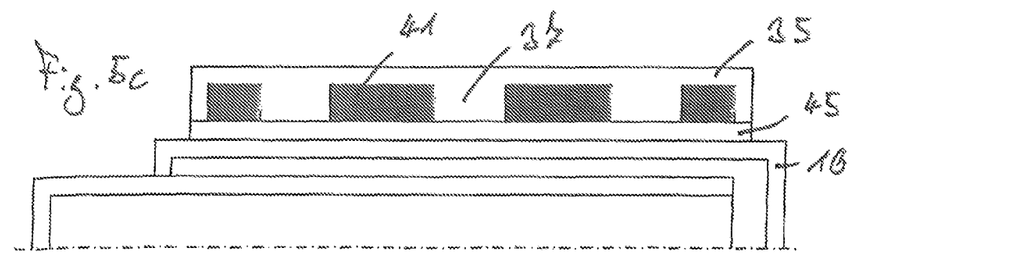
Figure 5D:
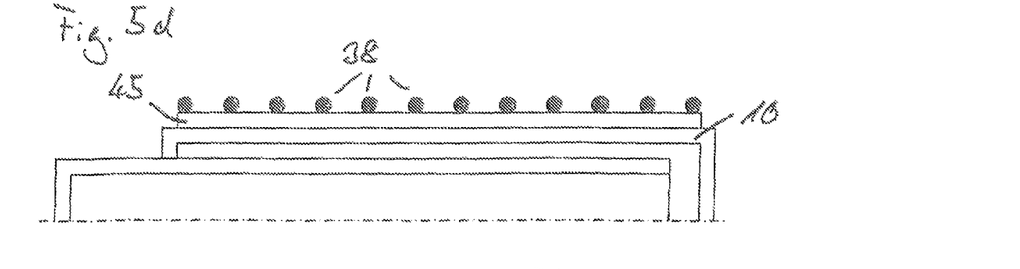

In FIG. 4d, on the other hand, the heat exchanger includes a tube element 38 which is wound spirally around the energy recovery cylinder and thus provides the flow space.

In the exemplary embodiments shown in FIGS. 4a to 4d, the outer tube 35 and the tube element 38 each are arranged directly on the cylinder jacket 10. In the exemplary embodiments shown in FIGS. 5a to 5d, on the other hand, a cylinder tube 45 is provided, which in a heat-conducting manner is arranged directly on the cylinder jacket 10. In FIGS. 5a to 5d, this cylinder tube 45 performs the same function as the cylinder jacket 10 in the exemplary embodiments of FIGS. 4a to 4d. Due to the cylinder tube, the heat exchanger forms a separate functional unit which can be pushed onto the energy recovery cylinder as a whole. Otherwise, the design of the heat exchangers in FIGS. 5a to 5d corresponds to the design shown in FIGS. 4a to 4d.

Figure 6A:
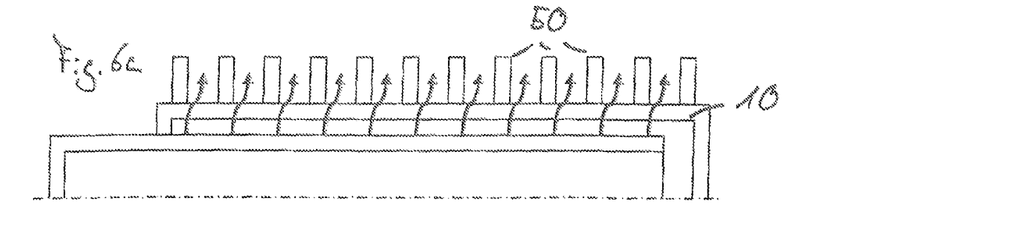
FIGS. 6a to 6c show three variants of an exemplary embodiment of an energy recovery cylinder with cooling ribs.
Figure 6B:
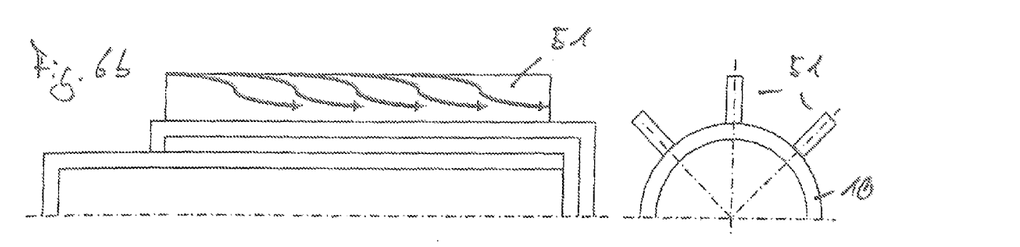
Figure 6C:
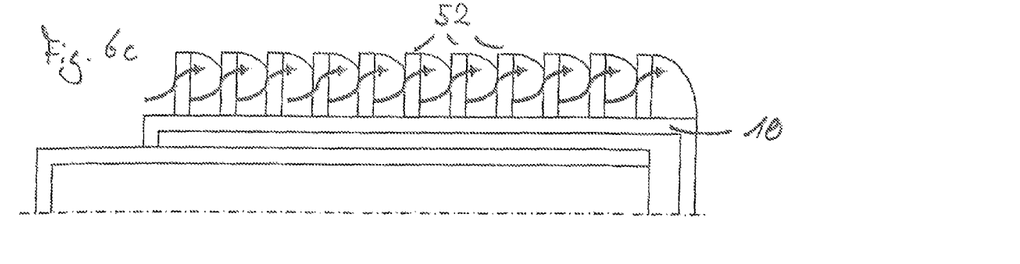

FIGS. 6a to 6c show three variants of a heat exchanger which is based on the principle of air cooling. For this purpose, the heat exchanger includes cooling ribs 50, 51, 52, which are swept by the outside air and thus withdraw heat from the energy recovery cylinder. The cooling ribs are arranged on the cylinder jacket 10. Here as well, however, as already described above, an additional cylinder tube might be arranged on the cylinder jacket 10, on which the cooling ribs are arranged.

Depending on the design, the cooling ribs can be shaped differently. The aim is to ensure a large surface area and a good sweeping of the cooling ribs.

In the exemplary embodiment shown in FIG. 6a radial cooling ribs 50 are provided, which, as can be taken from the sectional view along the longitudinal axis of the energy recovery cylinder, extend in planes vertical to the longitudinal axis of the energy recovery cylinder and around the energy recovery cylinder.

In the exemplary embodiment shown in FIG. 6b, on the other hand, cooling ribs 51 are provided, which extend in longitudinal direction of the energy recovery cylinder. This becomes particularly clear from the sectional view vertical to the longitudinal axis of the energy recovery cylinder, which is shown on the right.

In the exemplary embodiment shown in FIG. 6c, on the other hand, spiral cooling ribs are shown, which extend spirally around the energy recovery cylinder.

In a further aspect of the present invention a device for adjusting the temperature of an energy recovery cylinder is provided. The device for adjusting the temperature of the energy recovery cylinder can serve for cooling the energy recovery cylinder. Alternatively or in addition, the device can also serve for heating the energy recovery cylinder.

Advantageously, the device serves for adjusting the operating temperature of the energy recovery cylinder or of the gas arranged in the same. Advantageously, the adjustment of the temperature is effected on the basis of at least one operating parameter of the implement, which is introduced as input quantity into a controller for actuating the device for adjusting the temperature of the energy recovery cylinder.

Furthermore advantageously, a temperature sensor is provided, wherein the actuation of the device for adjusting the temperature of the energy recovery cylinder is effected on the basis of a signal of the temperature sensor.

Advantageously, the device for adjusting the temperature of the energy recovery cylinder comprises a heat exchanger with a flow space, as it has been described above. In particular when the device is used for cooling the energy recovery cylinder, such heat exchanger provides for connecting the energy recovery cylinder to a cooling circuit.

Figure 7:
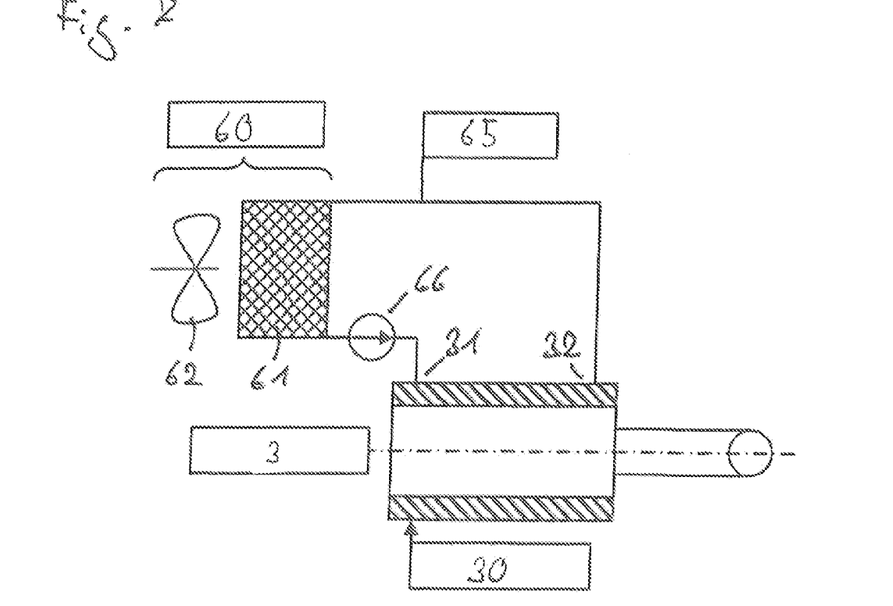
FIG. 7 shows an exemplary embodiment of a device according to the invention for adjusting the temperature of an energy recovery cylinder, wherein only a cooling is provided.

FIG. 7 now shows such an exemplary embodiment of a device for adjusting the temperature of the energy recovery cylinder 3. The energy recovery cylinder 3 includes a heat exchanger 30 with a flow space, which is connected to a cooling circuit 65 via the input and the output 31 and 32, respectively. Through the cooling circuit 65 cooling fluid is pumped by means of a pump 66. In the cooling circuit 65 a cooling unit 60 is arranged, by means of which the cooling fluid can be cooled. The cooling unit 60 comprises a further heat exchanger 61 and a fan 62 by means of which the heat exchanger 61 is cooled.

In this exemplary embodiment, the cooling fluid therefore flows through the external heat exchanger 61 by means of a circulation pump 66. In this heat exchanger 61, the fluid is cooled down by means of the series-connected fan and again pumped into the cooling circuit. In this way, excess heat which is produced during operation of the energy recovery cylinder 3 can be dissipated. Advantageously, the actuation of the cooling circuit and its components is effected by a controller. Advantageously, the actuation is effected on the basis of an operating parameter, in particular on the basis of the signal of a temperature sensor.

In the exemplary embodiment shown in FIG. 7, an active heating of the energy recovery cylinder is not possible. However, the energy recovery cylinder anyway heats up during operation due to the compression of the gas.

Figure 8:
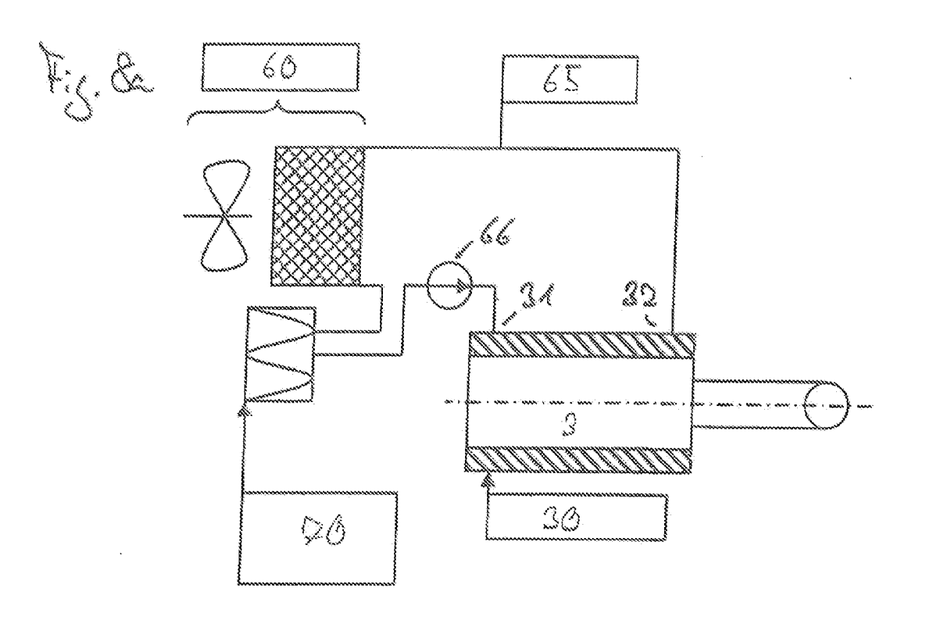
FIGS. 8a to 8c show three variants of an exemplary embodiment for adjusting the temperature of an energy recovery cylinder, wherein different variants of a heating arrangement are shown.
Figure 8B:
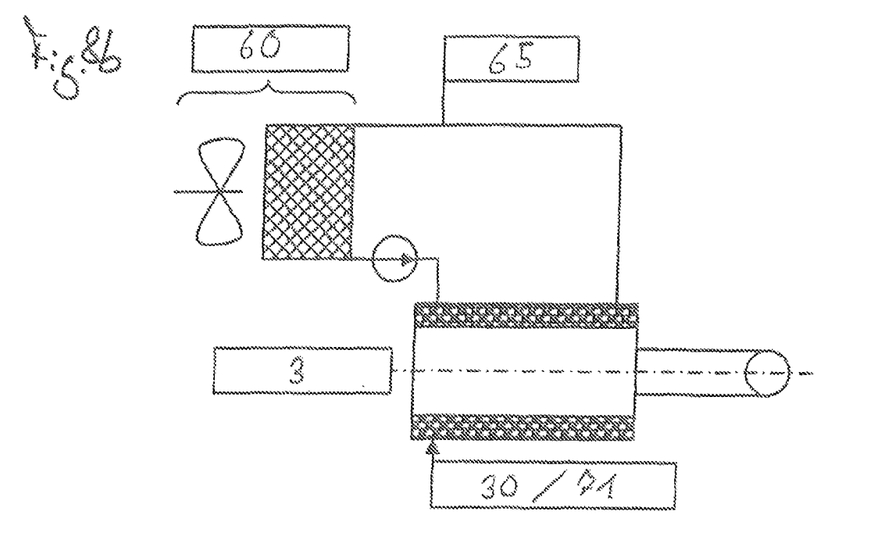
Figure 8C:
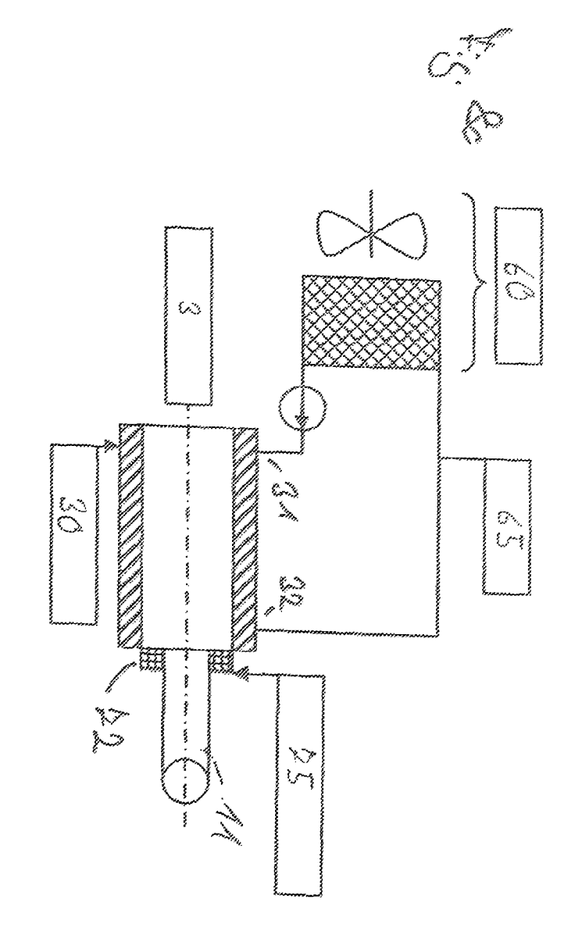

In FIGS. 8a to 8c, however, three variants of a device for adjusting the temperature of the energy recovery cylinder are shown, which provide for an active heating of the energy recovery cylinder. In the exemplary embodiments, these devices for heating the energy recovery cylinder are shown in combination with a device for cooling the energy recovery cylinder. The devices for heating the energy recovery cylinder might, however, also be provided alone and without a device for cooling. A device for heating the energy recovery cylinder in particular can be used in cool regions, or when the device is operated electrically.

In FIG. 8a, the heating of the energy recovery cylinder is effected in that a heating element 70 for heating the cooling fluid is integrated into the cooling circuit shown in FIG. 7. The cooling circuit hence serves as heating circuit for the energy recovery cylinder. Accordingly, the heating of the energy recovery cylinder operates according to the principle of a stationary heating. In this case, the cooling fluid in the cooling circuit is heated by an electric heating coil in the heating element 70 and pumped through the heat exchanger 30 by means of the circulation pump 66. This concept can also be realized without an active cooling, in that the cooling arrangement 60 is omitted.

In the exemplary embodiment shown in FIG. 8b, however, a heating element arranged directly on the energy recovery cylinder 3 is provided. In particular, an electric heating blanket can be provided, which is arranged around the energy recovery cylinder.

In the exemplary embodiment shown in FIG. 8c, however, the heating of the energy recovery cylinder is effected by means of friction elements 72, which under the control of an actuator 75 can be applied to the cylinder rod 11 and thus selectively generate friction for heating the energy recovery cylinder. The heating devices shown in FIGS. 8b and 8c also can be used either in combination with a cooling arrangement or independently.

The energy recovery cylinder need not be fed via a separate cooling circuit. Rather, in a particularly preferred embodiment, the energy recovery cylinder is connected to the cooling circuit of a further component of the implement, in particular to the cooling circuit of the internal combustion engine or the hydraulic system of the implement.

The heat exchanger can constantly be traversed by the cooling fluid from the cooling circuit of the implement, or be connected to said cooling circuit under the control of a circuit arrangement. The cooling fluid from the cooling circuit of the implement always has a constant temperature. In this way, two problems are solved at the same time: At the beginning of a working cycle, the cooling circuit can bring the energy recovery cylinder to a constant operating temperature. In this way, it is ensured that always the same operating pressure exists in the cylinder. As a result, always a constant force/stroke curve is ensured in the gas cylinder, independent of the outside temperature. The second point is the cooling of the energy recovery cylinder. In this way, it can be prevented that the temperature of the energy recovery cylinder rises excessively and the burst fuses are activated.

Figure 9:
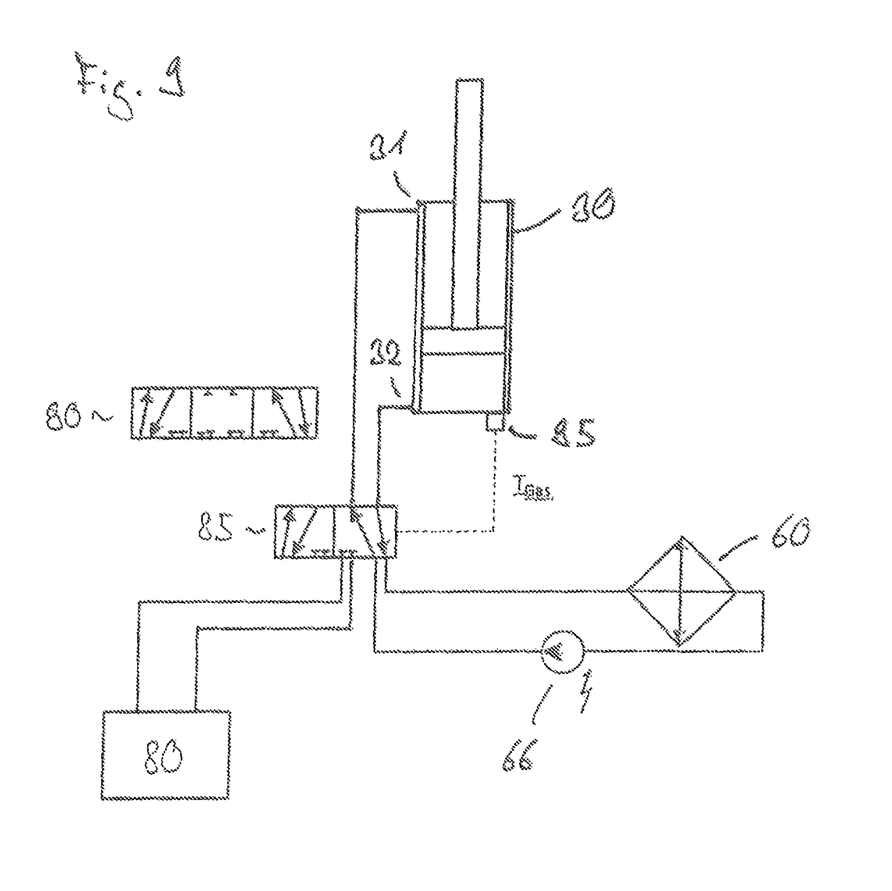
FIG. 9 shows a further exemplary embodiment of a device according to the invention for adjusting the temperature of an energy recovery cylinder in two variants.

The temperature of the energy recovery cylinder preferably is actuated via a controller and furthermore advantageously controlled via the signal of a temperature sensor. FIG. 9 now shows an exemplary embodiment of such a system. A temperature sensor 95 is provided at the energy recovery cylinder, which measures the temperature of the gas in the chamber filled with gas. Alternatively, the temperature sensor might also measure the temperature of the energy recovery cylinder or of the cooling fluid.

In dependence on the temperature of the temperature sensor 95, the device for adjusting the temperature of the energy recovery cylinder now is actuated by a controller. In particular, depending on the temperature, a device for heating and/or a device for cooling the energy recovery cylinder is switched on or off.

In an advantageous variant, the device for adjusting the temperature is operated such that the gas cylinder is operated in a defined gas temperature window between a minimum and a maximum operating temperature. This means, at temperatures below the minimum operating temperature the gas is brought to the minimum operating temperature by means of the engine circuit 80 or an external source. When the minimum operating temperature is reached, the heating circuit is switched off and the gas cylinder now operates autarkically. When the maximum operating temperature is exceeded, the cooling circuit is activated. In this case, for example, cooling liquid an be pumped through the heat exchanger only in the circuit without a cooler. Alternatively, an additional fan cooler can be provided, by which the cooling liquid is cooled.

Advantageously, the operating temperature window is chosen such that the heating and cooling control circuit is required only to a small extent. The primary objective here is to keep the energy expenditure for adjusting the temperature as small as possible. Here, for example a working range between 25° C. and 40° C. can be chosen as temperature window.

In the exemplary embodiment shown in FIG. 9, a switching valve 85 is provided for actuation in the cooling circuit, by which the heat exchanger 30 alternatingly can be connected with a device for heating 80 and a device for cooling 60. In the exemplary embodiment, the device 80 is the cooling circuit of a further element of the implement, in particular of the excavator, which here performs the function of heating the energy recovery cylinder. Alternatively, a separate heat source might be used. For cooling, a separate cooling circuit with a cooling element 60 and a circulation pump 66 is provided, wherein the cooling circuit advantageously has a power of more than one kilowatt, advantageously of more than three kilowatt and furthermore advantageously of about 5 kilowatt.

The actuation explained above now is effected in that below the minimum operating temperature the heat exchanger is connected with the heat source 80 and above the maximum operating temperature with the cooling circuit. Between the minimum and the maximum operating temperature, the cooling circuit can be connected to the cooling arrangement 60, without the same being operated.

Alternatively, the circuit arrangement designated with the reference numeral 90 in FIG. 9 can be chosen as variant, by which the heat exchanger of the energy recovery cylinder can be separated both from the heating arrangement 80 and from the cooling arrangement 60.

A corresponding actuation can of course also be effected in the exemplary embodiments shown in FIG. 8 by correspondingly switching on and off the heating and the cooling unit, respectively.

In different aspects, the present invention provides for operating the energy recovery cylinder with a rather constant operating temperature. On the one hand, it can thus be prevented in accordance with the invention that the gas cylinder heats up in an undefined way. Furthermore, the gas can be heated when necessary, so that the implement can be operated with a rather constant force/path characteristic curve of the energy recovery cylinder.

The invention claimed is:

1. An implement, with an element movable via at least one working drive,
   wherein at least one energy recovery cylinder is provided for energy recovery from the movement of the movable element, which includes a chamber filled with gas,
   wherein the energy recovery cylinder includes a heat exchanger,
   wherein the energy recovery cylinder comprises a longitudinally extending cylinder jacket having an outer surface, and a heat exchanger cylinder completely surrounding the cylinder jacket such that the outer surface of the cylinder jacket and an inner surface of the heat exchanger cylinder define a flow space in which heat exchange fluid can flow in a spiral pattern completely around the cylinder jacket,
   the implement further comprising:
      a temperature sensor configured to detect a temperature of the energy recovery cylinder,
      a controller configured to adjust a temperature of the energy recovery cylinder using the heat exchange fluid, such that the temperature of the energy recovery cylinder is maintained within a temperature window that includes a minimum operating temperature and a maximum operating temperature, wherein:
         when the temperature of the energy recovery cylinder is below the minimum operating temperature, a heating source is activated to heat the heat exchange fluid to raise the temperature of the energy recovery cylinder,
         when the temperature of the energy recovery cylinder is above the maximum operating temperature, a cooling source is activated to cool the heat exchange fluid to lower the temperature of the energy recovery cylinder, and
         when the temperature of the heat exchange fluid is within the temperature window the heating source and the cooling source are switched off.

2. The implement according to claim 1, wherein the space in which the heat exchange fluid flows is an annular space.

3. The implement according to claim 1, wherein the heat exchanger includes cooling ribs which can be swept by the outside air.

4. The implement according to claim 3, wherein the cooling ribs extend from the cylinder jacket of the energy recovery cylinder or from the heat exchanger cylinder to the outside and advantageously extend in radial direction or in longitudinal direction or spirally.

5. The implement according to claim 1, wherein the spiral pattern of flow of the heat exchange fluid is caused by recesses in the outer surface of the cylinder jacket and/or the inner surface of the heat exchanger cylinder.

6. The implement according to claim 5, wherein the spiral pattern of flow of the heat exchange fluid is caused by recesses in the outer surface of the cylinder jacket.

7. The implement according to claim 5, wherein the spiral pattern of flow of the heat exchange fluid is caused by recesses in the inner surface of the heat exchanger cylinder.

8. The implement according to claim 1, wherein the heat exchanger serves for cooling and/or heating the energy recovery cylinder, the heat exchanger advantageously being connected to a cooling and/or heating circuit of the implement.

9. The implement according to claim 4, wherein the cooling ribs extend from the heat exchanger cylinder.

10. The implement according to claim 4, wherein the cooling ribs extend from the cylinder jacket.

11. The implement according to claim 10, wherein the cooling ribs extend in a longitudinal direction.

12. The implement of claim 1 wherein the energy recovery cylinder includes a filling valve and a pressure limiting valve.

13. The implement of claim 12 wherein the pressure limiting valve is actuated in response to an excessive rise of temperature in the gas.

14. The implement of claim 13 wherein the energy recovery cylinder further includes a temperature sensor.

15. The implement of claim 14 wherein the energy recovery cylinder is connected to a cooling circuit, wherein cooling fluid supplied from the cooling circuit always has a constant temperature when the implement is in operation, such that the temperature does not change.

16. An implement, with an element movable via at least one working drive,
   wherein at least one energy recovery cylinder is provided for energy recovery from the movement of the movable element, which includes a chamber filled with gas,
   the energy recovery cylinder includes a heat exchanger,
   the energy recovery cylinder comprises a longitudinally extending cylinder jacket having an outer surface,
   the energy recovery cylinder includes a tube element wound spirally around it such that the tube element is positioned on the outer surface of the cylinder jacket, and an inside of the tube element defines a flow space in which heat exchange fluid can flow through and in a spiral pattern completely around the cylinder jacket,
   the implement further comprising:
      a temperature sensor configured to detect a temperature of the energy recovery cylinder,
      a controller configured to adjust a temperature of the energy recovery cylinder using the heat exchange fluid, such that the temperature of the energy recovery cylinder is maintained within a temperature window that includes a minimum operating temperature and a maximum operating temperature, wherein:
         when the temperature of the energy recovery cylinder is below the minimum operating temperature, a heating source is activated to heat the heat exchange fluid to raise the temperature of the energy recovery cylinder,
         when the temperature of the energy recovery cylinder is above the maximum operating temperature, a cooling source is activated to cool the heat exchange fluid to lower the temperature of the energy recovery cylinder, and
         when the temperature of the heat exchange fluid is within the temperature window the heating source and the cooling source are switched off.

* * * * *